United States Patent [19]

Magyari

[11] Patent Number: 4,966,502

[45] Date of Patent: Oct. 30, 1990

[54] HOLLOW DRILLING TOOL

[75] Inventor: Eugen Magyari, Gams, Switzerland

[73] Assignee: Hilti Aktiengesellschaft, Fürstentum Liechtenstein, Liechtenstein

[21] Appl. No.: 383,367

[22] Filed: Jul. 20, 1989

[30] Foreign Application Priority Data

Jul. 20, 1988 [DE] Fed. Rep. of Germany ....... 3824502

[51] Int. Cl.[5] .............................................. B23B 51/04

[52] U.S. Cl. ....................................... 408/59; 408/204

[58] Field of Search .................... 408/204, 206, 57, 59, 408/207, 223

[56] References Cited

U.S. PATENT DOCUMENTS

| | | | |
|---|---|---|---|
| 53,722 | 4/1866 | Wyckoff | 408/206 |
| 2,188,631 | 1/1940 | Kraus | 408/59 |
| 3,244,035 | 4/1966 | Jehle et al. | 408/204 |
| 3,817,648 | 6/1974 | Miller | 408/59 |
| 4,274,769 | 6/1981 | Multakh | 408/204 |
| 4,539,750 | 9/1985 | Jarvi et al. | 408/204 |

FOREIGN PATENT DOCUMENTS

| | | | |
|---|---|---|---|
| 72595 | 6/1979 | Japan | 408/204 |
| 81011 | 5/1984 | Japan | 408/204 |

*Primary Examiner*—Daniel W. Howell
*Attorney, Agent, or Firm*—Toren, McGeady & Associates

[57] ABSTRACT

A hollow drilling tool includes a tubular support with cutting members inserted in axially extending recesses in its leading end. The cutting members alternately project radially outwardly from and radially inwardly from the outer and inner surfaces of the support. An effective removal of drilled materials is possible by partly annular gaps between the cutting members and the borehole surface and the surface of the drilled core.

2 Claims, 1 Drawing Sheet

Fig. 1
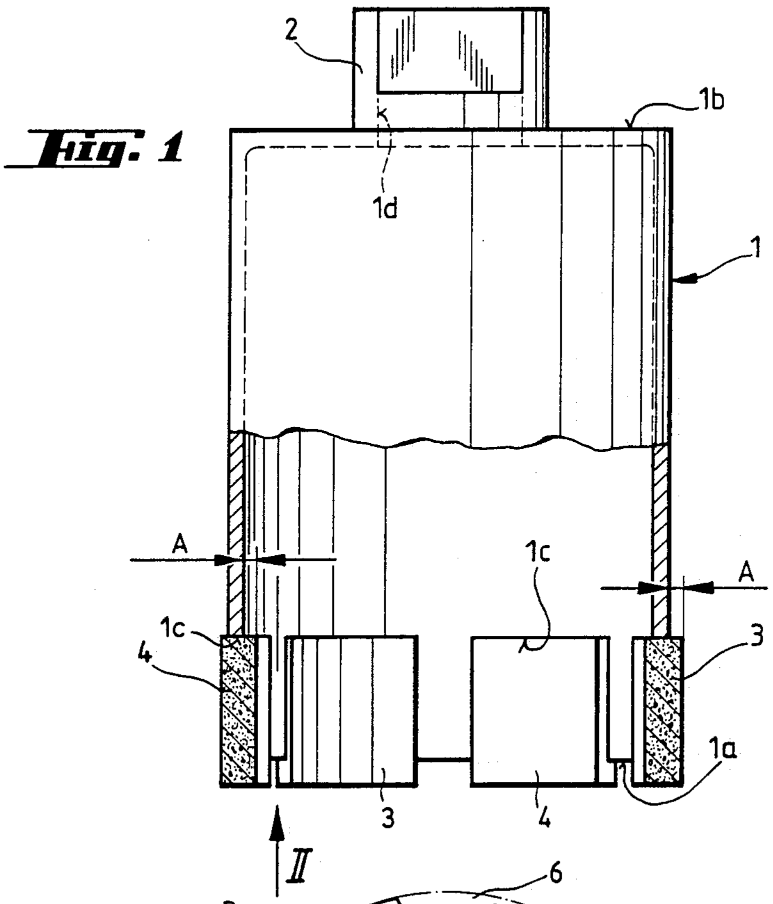
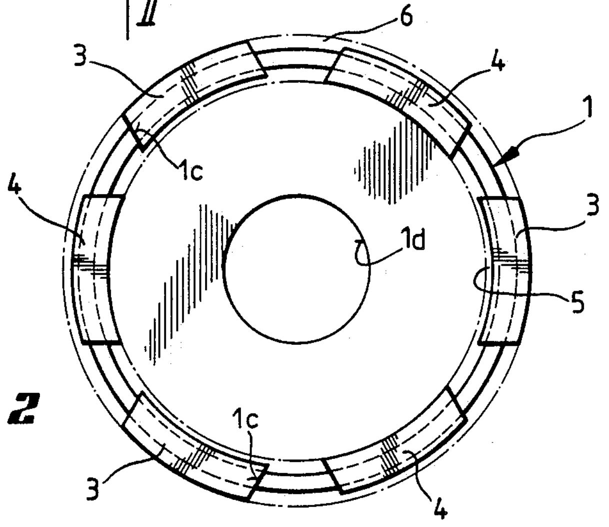
Fig. 2

HOLLOW DRILLING TOOL

BACKGROUND OF THE INVENTION

The present invention is directed to a hollow drilling tool including a tubular support and cutting segments containing a hard material arranged at the leading end of the support.

Hollow drilling tools, known from DE-GM No. 85 15 322 are used in particular for the cutting of boreholes of larger diameters in concrete, masonry, stone and the like. The cutting member contains abrasive cutting bodies to a hard material, particularly synthetic diamonds embedded in a metallic matrix. The cutting members are usually larger in the radial direction than the corresponding wall thickness of the tubular support, whereby a free cutting is effected and the surface of the tubular support does not contact the surfaces of the material being cut.

The production of such hollow drilling tools is particularly costly with regard to material costs, since the cutting members have a large cross section and a large amount of hard material is required for producing the cutting members.

SUMMARY OF THE INVENTION

The primary object of the present invention is to provide a hollow drilling tool which, in addition to good free cutting characteristics, is simple and economical to manufacture.

In accordance with the present invention, the cutting members are positioned on the tubular support so that one group of the cutting members projects inwardly from the inner surface of the tubular support and another group of the cutting members projects radially outwardly from the outer surface of the tubular support.

As a result, the cutting members are offset relative to one another in the radial direction. Since only one group of the cutting members projects from the inner surface of the tubular support, and one group of the cutting members projects from the outer surface of the tubular support, the cutting members can be thinner in the radial direction than the known cutting members which project radially from both the inner and outer surfaces of the tubular support. Accordingly, it is possible to economize on hard materials up to approximately 30%, and the corresponding quantity of matrix material can also be reduced in addition to the hard materials. Since only a portion of the cutting members slide along the outer and inner surface of the hollow borehole to be produced, friction is also reduced with regard to the hollow drilling tool. Because of the radial offset between the groups of cutting members, and the thinner construction of the cutting members, larger flow-through sections for cooling and rinsing water and for removing drillings are possible. Such flow-through cross sections occur between the inwardly projecting cutting members and the borehole wall and between the outwardly projecting cutting members and the drilled core.

Cutting members which project either inwardly from the inner surface or outwardly from the outer surface of the tubular support, in an alternating manner, are arranged around the circumference of the tubular support. Accordingly, cutting members alternately cut the outside and inside of the borehole being produced so that an effective distribution of the cutting forces is achieved. The offset arrangement of the adjacent cutting members can be compared with the pitch of a saw blade whereby jamming in the material being drilled is prevented and, in addition, an effective removal of the drilled material is insured.

All of the cutting members projecting outwardly from the outer surface of the tubular support have the same radius. Accordingly, the cutting members projecting radially outwardly from the outer surface of the tubular support glide along all of the outer surfaces of the borehole being produced and lead to a good centering of the hollow drilling tool and, in addition, afford a good surface-finish quality and exact geometry of the borehole.

All of the cutting members projecting radially inwardly from the inner surface of the tubular support have the same radius, particularly promoting good guidance and circular running of the hollow drilling tool.

Preferably, the cutting members project from the inner and outer surfaces of the tubular support, substantially to the same extent. Accordingly, particularly in larger diameter hollow drilling tools, the same elements can be used for the cutting members projecting radially from the inner surface and the outer surface of the tubular support.

It is advisable that the cutting members extend, at least partially into axially extending recesses, in the leading end of the tubular support. Preferably, such recesses are U-shaped. Inserting the cutting members into the recesses in the tubular support results in good support for the cutting members in the tubular support. The cutting members can be connected to the tubular support by soldering or welding.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a elevational view of a hollow drilling tool embodying the present invention and shown partly in axially extending sections; and FIG. 2 is an end view of the hollow drilling tool, shown in FIG. 1, with the view taken in the direction of the arrow II.

DETAILED DESCRIPTION OF THE INVENTION

As displayed in FIGS. 1 and 2, a hollow drilling tool comprises a tubular support 1, with a leading end **1*a* in the drilling direction, and a trailing end 1*b*. At the trailing end 1*b*, a connection sleeve 2 is secured to the tubular support 1. Connection sleeve 2 serves for attaching the hollow drilling tool to a drilling device, not shown. The tubular support 1 has a plurality of U-shaped recesses 1*c* at its leading end for receiving cutting members 3, 4**, including a hard cutting material.

As set forth in FIG. 2, in particular, the cutting segments 3, 4 are arranged to project either radially outwardly from, or radially inwardly from, the corresponding surface of the tubular support. Cutting members 3 are secured to the tubular support so that their radially outer surfaces project radially outwardly from the outer surface of the tubular support. Conversely, cutting members 4 are arranged so that they project radially inwardly from the inner surface of the tubular support 1. As a result, alternately, the cutting members project radially inwardly or radially outwardly relative to the tubular support. As shown in FIG. 1, the cutting members 3, 4 project outwardly from, or inwardly from, the corresponding surface of the tubular support 1 by substantially the same dimension A. Particularly, in larger diameter hollow drilling tools, the same element can be used for the cutting members 3, 4, since the difference between the inner radius and the outer radius is relatively slight. The cutting members 3, 4 are soldered into the recesses 1*c*. of the tubular support 1 and, as a result, are connected with the tubular support along three sides. Due to the radial projection of the cutting members 3, 4, partly annular gaps 5 of a relatively large flow-through cross-section for the cooling water, fed through a borehole 1*d*, occur between the outwardly projecting cutting members 3 and the core in the borehole, and partly annular gaps 6 having a relatively large flow-through cross section for the drilled material are formed between the inwardly projecting cutting member and the surface of the borehole.

While specific embodiments of the invention have been shown and described in detail to illustrate the application of the inventive principles, it will be understood that the invention may be embodied otherwise without departing from such principles.

I claim:

1. Hollow drilling tool comprising an axially extending tubular support (1) having a leading end (1*a*) in the drilling direction and an opposite trailing end (1*b*), said tubular support having a radially inner surface and a radially outer surface, wherein the improvement comprises a plurality of cutting members (3, 4) secured in a fixed manner to said support at the leading end thereof and disposed in circumferentially spaced relation, said cutting members extend in the axial and circumferential direction of said tubular support and extend from the leading end toward and spaced from the trailing end of said tubular support, each said cutting member has a radially inner surface and a radially outer surface relative to the axis of said tubular support, a number of first said cutting members (3) having the outer surface thereof projecting radially outwardly from the outer surface of said tubular support (1), a number of second said cutting members (4) having the inner surfaces thereof projecting radially inwardly from the inner surface of said tubular support, the outer surface of said first cutting members (3) project radially outwardly beyond the radially outer surfaces of said second cutting members (4) and the radially inner surfaces of said second cutting members (4) project inwardly from the radially inner surface of said first cutting members (3), said first and second cutting members (3, 4) project alternatively radially outwardly from, and radially inwardly from, the corresponding surfaces of the tubular support and are arrange around the circumference of said tubular support (1) at the leading end (1*a*) thereof, all of said first cutting members (3) projecting radially outwardly from the outer surface of the tubular support (1) are arranged on the same radius relative to the axis of said tubular support, all of said second cutting members (4) project radially inwardly from the inner surface of said tubular support (1) are arranged on the same radius relative to the axis of said tubular support, said first and second cutting members (3, 4) are approximately of the same dimensional size and project radially from the outer or inner surface of said tubular support (1) by substantially the same dimension A for the axial and circumferential directions thereof, a borehole (1*a*) at said trailing end of said tubular support for introducing cooling water to the interior of said tubular support and partly annular gaps (5, 6) of substantially the same size extending in the axial and circumferential directions of said tubular support defined between adjacent said first cutting members and the outer surface of said tubular support and between adjacent said second cutting member and the inner surface of said tubular support.

2. Hollow drilling tool, as set forth in claim 1, wherein U-shaped recesses (1*c*) are formed in the leading end of said tubular support and extend axially toward the trailing end thereof, said recesses are open at the leading end (1*a*) and said cutting members (3, 4) are seated within and project axially from said recesses and are secured to said tubular support.

* * * * *